(12) United States Patent
Kang et al.

(10) Patent No.: US 12,534,666 B2
(45) Date of Patent: Jan. 27, 2026

(54) BLUE PHOSPHORESCENT MATERIAL, PRODUCTION METHOD THEREOF, AND PHOTOPHYSICAL PROPERTIES THEREOF

(71) Applicant: Korea University Research and Business Foundation, Sejong Campus, Sejong-si (KR)

(72) Inventors: Sang Ook Kang, Sejong-si (KR); Ho Jin Son, Suwon-si (KR)

(73) Assignee: Korea University Research and Business Foundation, Sejong Campus, Sejong-si (KR)

( * ) Notice: Subject to any disclaimer, the term of this patent is extended or adjusted under 35 U.S.C. 154(b) by 884 days.

(21) Appl. No.: 17/743,016

(22) Filed: May 12, 2022

(65) Prior Publication Data

US 2022/0333007 A1    Oct. 20, 2022

Related U.S. Application Data

(63) Continuation of application No. PCT/KR2020/015930, filed on Nov. 12, 2020.

(30) Foreign Application Priority Data

Nov. 13, 2019  (KR) .......................... 10-2019-0145231

(51) Int. Cl.
*C09K 11/06*     (2006.01)
*C07F 15/00*     (2006.01)

(52) U.S. Cl.
CPC .......... *C09K 11/06* (2013.01); *C07F 15/0033* (2013.01); *C09K 2211/1007* (2013.01); *C09K 2211/1029* (2013.01); *C09K 2211/1044* (2013.01); *C09K 2211/185* (2013.01)

(58) Field of Classification Search
CPC ............ C09K 11/06; C09K 2211/1007; C09K 2211/1029; C09K 2211/1044; C09K 2211/185; C07F 15/0033
See application file for complete search history.

(56) References Cited

U.S. PATENT DOCUMENTS 8,609,257 B2 * 12/2013 Ise ..................... H10K 85/6572
                                                    252/301.16
8,883,322 B2   11/2014 Wu et al.
9,487,548 B2   11/2016 Molt et al.
2016/0293864 A1  10/2016 Forrest et al.
2022/0333008 A1 * 10/2022 Kang .................. C07F 15/0033

FOREIGN PATENT DOCUMENTS

| JP | 2003-264086 A | 9/2003 | |
|---|---|---|---|
| KR | 10-2015-0069309 A | 6/2015 | |
| KR | 10-2015-0079220 A | 7/2015 | |
| KR | 10-2016-0140831 A | 12/2016 | |
| KR | 10-1771530 B1 | 8/2017 | |
| KR | 10-2018-0027648 A | 3/2018 | |
| KR | 10-2018-0118253 A | 10/2018 | |
| KR | 10-2020-0049495 A | 5/2020 | |
| WO | 2015150203 A1 | 10/2015 | |
| WO | WO-2020091344 A1 * | 5/2020 | ............. C09K 11/06 |

OTHER PUBLICATIONS

Volpi; Molecules 2024, 29, 2668. https://doi.org/10.3390/molecules29112668 (Year: 2024).*
Baek et al., "Photophysical Properties of Structural Isomers of N-Heterocyclic Carbene Iridium(III) Complexes Derived from Xylene Substitution", Abstracts of the Polymer Society of Korea Conference Research Thesis, vol. 45, No. 2, p. 106 at 2PS-157 (2020).
Choi et al., "Photophysical properties on structural isomers of homoleptic Ir-complexes derived from xylenyl-substituted N-heterocyclic carbene ligands", Abstracts of the Polymer Society of Korea Conference Research Thesis, vol. 44, No. 1, p. 151 at 3PS-270 (2019).
Yun et al., "Photophysical properties of structural isomers of homoleptic Ir-complexes derived from xylenyl-substituted N-heterocyclic carbene ligands", Physical Chemistry Chemical Physics, vol. 21, pp. 7155-7164 (2019).
International Search Report for International Application No. PCT/KR2020/015930 dated Jun. 4, 2021, 3 pages.
Written Opinion of the International Searching Authority for International Application No. PCT/KR2020/015930 mailed Jun. 4, 2021, 6 pages.

* cited by examiner

*Primary Examiner* — Daniel R Carcanague
(74) *Attorney, Agent, or Firm* — Finch & Maloney PLLC

(57) ABSTRACT

This blue phosphorescent material includes: a central metal containing iridium; and a phenyl-imidazopyridine ligand which is a bidentate ligand of the central metal and has an iridium-carbon bond with the central metal, wherein the ligand may include a ligand in which a 2,6-dimethylphenyl functional group has been introduced to a phenyl group of the ligand. The present application relates to a blue phosphorescent material, a production method thereof, and photophysical properties thereof, the blue phosphorescent material having an iridium-carbon bond and including a phenyl-imidazopyridine ligand to which a sterically hindered functional group has been introduced.

7 Claims, 17 Drawing Sheets

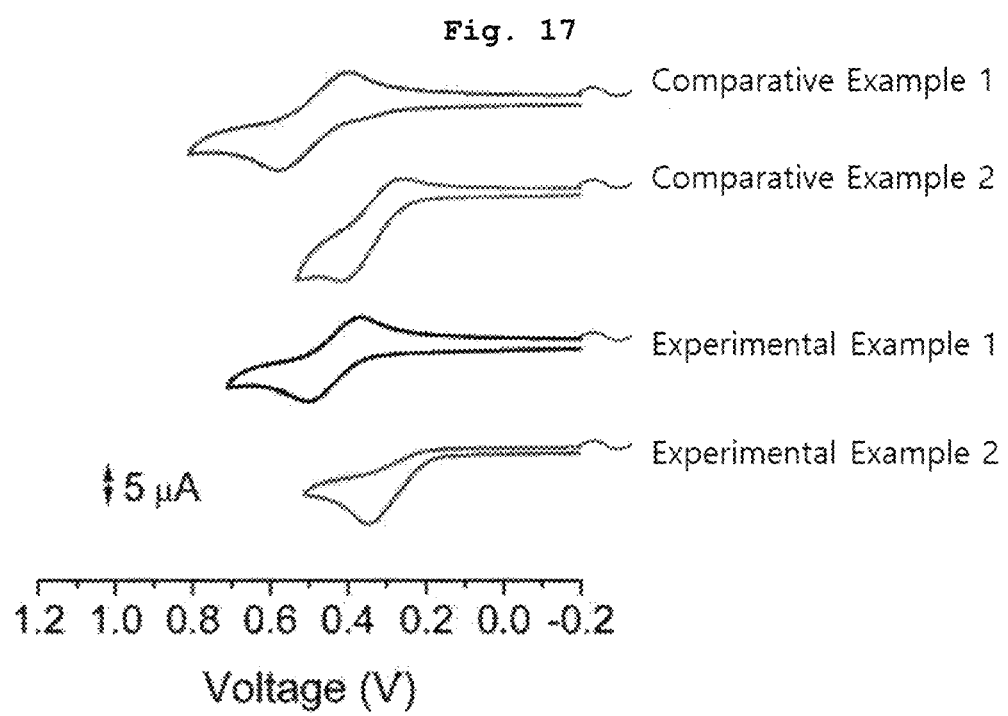

BLUE PHOSPHORESCENT MATERIAL, PRODUCTION METHOD THEREOF, AND PHOTOPHYSICAL PROPERTIES THEREOF

TECHNICAL FIELD

The present application relates to a blue phosphorescent material, a production method thereof, and photophysical properties thereof, and more particularly, to a blue phosphorescent material, a production method thereof, and photophysical properties thereof, the blue phosphorescent material having a central metal containing iridium; and a phenyl-imidazopyridine ligand which is a bidentate ligand of the central metal and has an iridium-carbon bond with the central metal and including a phenyl-imidazopyridine ligand to which a sterically hindered functional group has been introduced.

BACKGROUND ART

In general, a phosphorescent dopant may have a theoretical quantum efficiency three times higher than that of a fluorescent dopant. Accordingly, a phosphorescent dopant is mainly used in an organic light emitting diode (OLED) as compared to a fluorescent dopant.

However, most of the conventional blue phosphorescent dopants have lower luminous efficiency than that of blue fluorescent dopants, and thus in commercial organic light emitting diodes, a fluorescent dopant is mainly used for a blue color.

Thus, a research has been in progress to develop a blue phosphorescent dopant having a higher luminous efficiency than that of a fluorescent dopant. For example, Korean Patent Registration Publication No. 10-1771530 (application number 10-2010-0032874) discloses an organic metal compound, which has an alkyl-pyridin-2-carboxymidic acid as a main ligand and includes any one auxiliary ligand selected from among phenyl-pyridine, 2-benzyl-pyridine, 1,2-diphenyl-1H-imidazole, 1-benzyl-2-phenyl-1H-benzoimidazole or 1,2-diphenyl-1H-benzoimidazole.

DISCLOSURE

Technical Problem

One technical object of the present invention is to provide a blue phosphorescent material, a production method thereof, and photophysical properties thereof, the blue phosphorescent material including a central metal containing iridium; and a phenyl-imidazopyridine ligand which is a bidentate ligand of the central metal and to which a sterically hindered functional group has been introduced.

Another technical object of the present invention is to provide a blue phosphorescent material, a production method thereof, and photophysical properties thereof, the blue phosphorescent material including a phenyl-imidazopyridine ligand to which a sterically hindered functional group has been introduced, and including a facial isomer or a meridional isomer.

Still another technical object of the present invention is to identify a source of luminescent properties through evaluation of photophysical properties and provide a blue phosphorescent material, a production method thereof, and photophysical properties thereof, the blue phosphorescent material usable as a dopant of an organic light emitting diode.

The technical objects of the present invention are not limited to the above.

Technical Solution

To solve the above technical objects, the present application may provide a blue phosphorescent material.

According to one embodiment, the blue phosphorescent material may include: a central metal containing iridium; and a phenyl-imidazopyridine ligand which is a bidentate ligand of the central metal and has an iridium-carbon bond with the central metal, in which the ligand may include one in which a 2,6-dimethylphenyl functional group has been introduced to a phenyl group of the ligand.

According to one embodiment, the functional group may be introduced at an ortho position of the phenyl group.

According to one embodiment, the functional group may be vertically bound to the phenyl group.

According to one embodiment, the blue phosphorescent material may include the ligand as a homo-ligand, and include at least any one from a facial isomer or a meridional isomer.

According to one embodiment, the blue phosphorescent material may include the ligand as a main ligand, and further include an auxiliary ligand.

According to one embodiment, the blue phosphorescent material may include an absorption band at a wavelength region of 720 nm in a femtosecond time-resolved transient absorption spectrum.

To solve the above technical objects, the present application may provide a method for preparing a blue phosphorescent material.

According to one embodiment, the method for preparing a blue phosphorescent material may include: preparing a ligand in which a 2,6-dimethylphenyl functional group is introduced to a phenyl group of phenyl-imidazopyridine; providing a mixed solution containing the ligand and a iridium compound; and preparing the blue phosphorescent material through a metalation reaction between the ligand and iridium of the iridium compound.

According to one embodiment, the preparing of the ligand may include: providing the 2,6-dimethylphenyl functional group to phenyl-amine; and preparing the ligandby introducing imidazopyridine into the phenyl group of the phenyl-amine.

According to one embodiment, the performing of a metalation reaction between the ligand and iridium of the iridium compound may include preparing at least any one from a facial isomer or a meridional isomer.

Advantageous Effects

According to an embodiment of the present invention, a blue phosphorescent material can include: a central metal containing iridium; and a phenyl-imidazopyridine ligand which is a bidentate ligand of the central metal and has an iridium-carbon bond with the central metal, in which a 2,6-dimethylphenyl functional group has been introduced to a phenyl group of the ligand.

The functional group can be introduced at an ortho position of the phenyl group, and thus the functional group can easily provide a steric hindrance effect to the blue phosphorescent material.

Accordingly, a n-n*transition of the blue phosphorescent material can be increased, and thus a maximum emission wavelength of the blue phosphorescent material can be shifted to a longer wavelength.

In addition, the blue phosphorescent material can have an absorption band at a wavelength region of 720 nm in a femtosecond time-resolved transient absorption spectrum, and thus a phosphorescence lifetime of the blue phosphorescent material can be reduced.

In other words, the functional group can be introduced and an iridium-carbon bond of the blue phosphorescent material can be changed, thereby providing the blue light-emitting material with adjusted emission properties such as an emission wavelength, a phosphorescence lifetime, and the like.

DESCRIPTION OF DRAWINGS

FIG. 17 is a graph showing results of cyclic voltammetry of a blue phosphorescent material according to an embodiment of the present invention.

MODE FOR INVENTION

Figure 1:
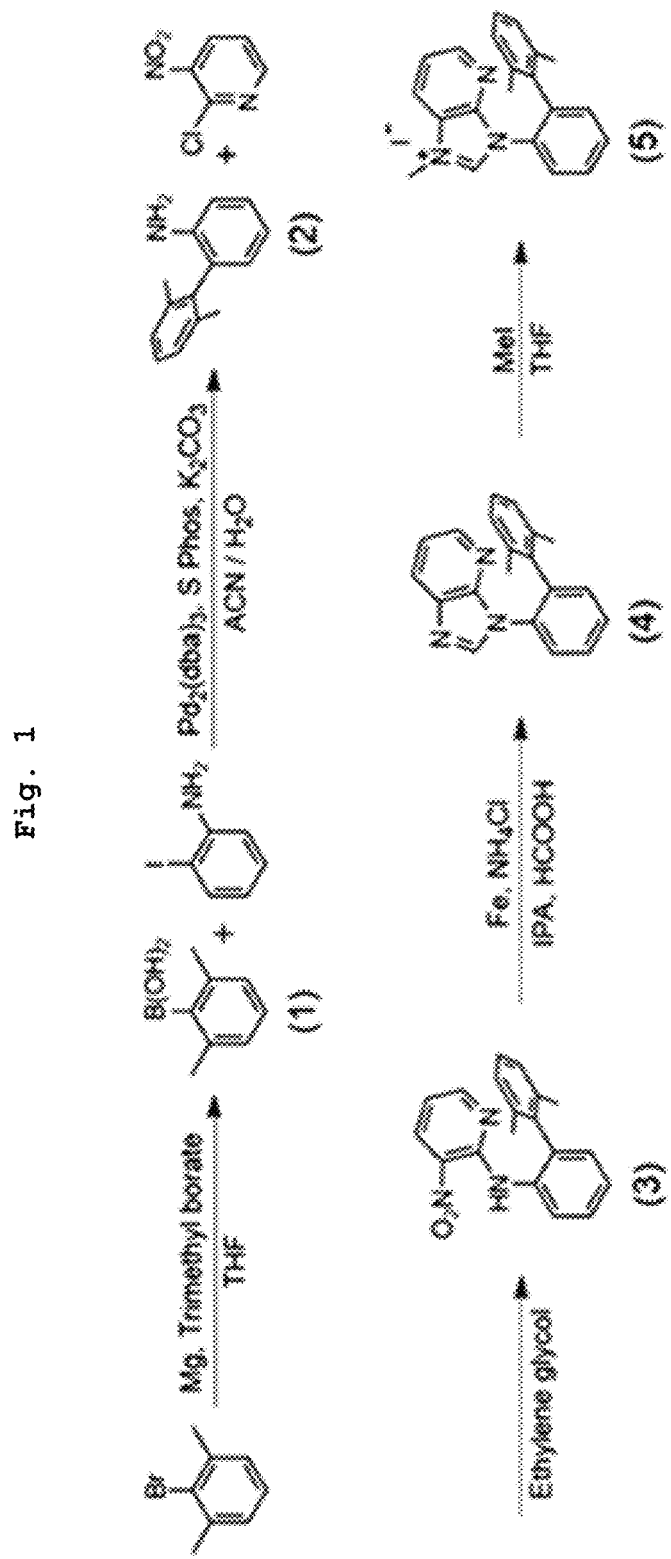
FIGS. 1 to 2 are a reaction mechanism showing a method for preparing a blue phosphorescent material according to an embodiment of the present invention

Hereinafter, preferred embodiments of the present invention will be described in detail with reference to the accompanying drawings. However, the technical spirit of the present invention is not limited to the embodiments, but may be realized in different forms. The embodiments introduced herein are provided to sufficiently deliver the spirit of the present invention to those skilled in the art so that the disclosed contents may become thorough and complete.

When it is mentioned in the specification that one element is on another element, it means that the first element may be directly formed on the second element or a third element may be interposed between the first element and the second element. Further, in the drawings, the thicknesses of the membrane and areas are exaggerated for efficient description of the technical contents.

Further, in the various embodiments of the present specification, the terms such as first, second, and third are used to describe various elements, but the elements are not limited to the terms. The terms are used only to distinguish one element from another element. Accordingly, an element mentioned as a first element in one embodiment may be mentioned as a second element in another embodiment. Each of the embodiments described and illustrated herein also include their complementary embodiments. Further, the term "and/or" in the specification is used to include at least one of the elements enumerated in the specification.

In the specification, the terms of a singular form may include plural forms unless otherwise specified. Further, the terms "including" and "having" are used to designate that the features, the numbers, the steps, the elements, or combinations thereof described in the specification are present, and are not to be understood as excluding the possibility that one or more other features, numbers, steps, elements, or combinations thereof may be present or added.

Further, in the following description of the present invention, a detailed description of known functions or configurations incorporated herein will be omitted when it may make the subject matter of the present invention unnecessarily unclear.

Figure 2:
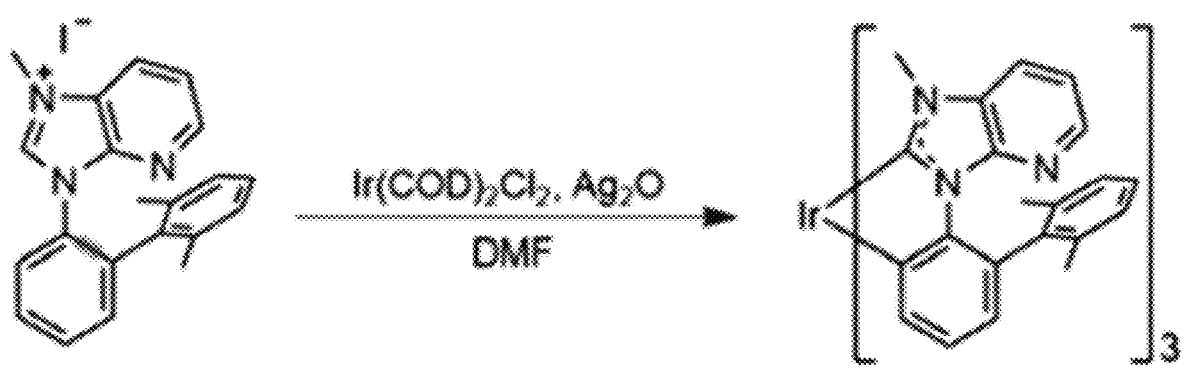
Figure 3:
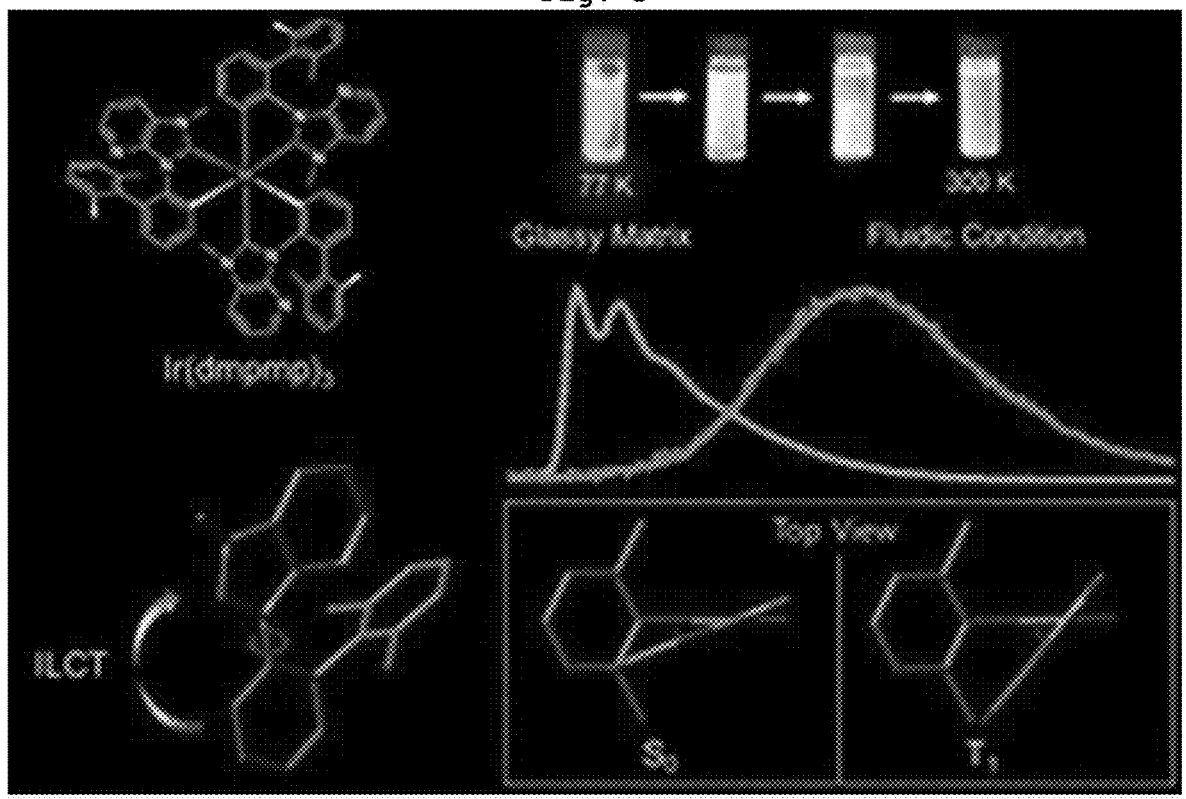
FIG. 3 is a view for explaining a structure and emission properties of a blue phosphorescent material according to an embodiment of the present invention.

FIGS. 1 to 2 are a reaction mechanism showing a method for preparing a blue phosphorescent material according to an embodiment of the present invention, and FIG. 3 is a view for explaining a structure and emission properties of a blue phosphorescent material according to an embodiment of the present invention.

According to one embodiment, a blue phosphorescent material including: a central metal containing iridium; and a phenyl-imidazopyridine ligand which is a bidentate ligand of the central metal and to which a sterically hindered functional group has been introduced may be prepared. Herein, the sterically hindered functional group may be a 2,6-dimethylphenyl functional group, and the sterically hindered functional group may be introduced at an ortho position of the phenyl group of the ligand.

Specifically, the blue phosphorescent material may include an iridium-carbon bond between the central metal and the ligand, in which the iridium-carbon bond may be either a single bond or a coordination bond. For example, the functional group may be introduced at an ortho position of the phenyl group. Alternatively, as another example, the functional group may be introduced at any one position from meta or para of the phenyl group.

According to one embodiment, the blue phosphorescent material may include a homo-ligand iridium complex compound containing the ligand as a homo-ligand. In this case, the homo-ligand iridium complex compound may be prepared according to the reaction mechanism as shown in FIGS. 1 to 2.

Specifically, as shown in FIG. 1, a first halide including the 2,6-dimethylphenyl functional group may be prepared. As described above, the 2,6-dimethylphenyl functional group may be introduced to a phenyl group of the ligand. However, in general, carbon bound to a halogen element of the first halide may have relatively low reactivity with carbon at an ortho position of the phenyl group. Accordingly, as shown in FIG. 1, the halogen element may be substituted with boric acid, and thus the 2,6-dimethylphenyl functional group may be relatively easily introduced into the ortho position of the phenyl group. In other words, the first halide may be changed to a boronic acid compound including the 2,6-dimethylphenyl functional group, thereby improving reactivity with the carbon at the ortho position of the phenyl group.

The boronic acid compound and phenyl-amine may be reacted to prepare an intermediate product in which the 2,6-dimethylphenyl functional group is bound to the ortho position of the phenyl-amine. In other words, the intermediate product in which a 2,6-dimethylphenyl group is provided at a 2nd carbon position of phenyl-amine may be prepared.

After binding nitropyridine to the amine group of the intermediate product, a ligand may be prepared by reacting the nitro group of the nitropyridine with the amine group.

In this case, as shown in FIG. 1, the binding of nitropyridine to the amine group may include reacting the amine group with a second halide including the nitropyridine.

Unlike the first halide, the second halide may react with the amine group. In general, a halide may easily react with the amine group, and according to the reaction, a halogen element of the halide and a hydrogen element of the amine group may be bound to form a halogen acid.

The binding of the nitro group with the amine group may include forming a pentacyclic gonal ring by binding one oxygen element of the nitro group with a nitrogen element of the amine group, while removing another oxygen element of the nitro group and a hydrogen element of the amine group at the same time, and substituting an oxygen element in the pentacyclic ring with a carbon element.

Thus, the binding of nitropyridine to the amine group may be performed for a first time period, and the binding of the nitro group with the amine group may be performed for a second time period longer than the first time period. Specifically, for example, the first time period may be 10 hours, and the second time period may be 24 hours.

Alkyl halide may be bound to the ligand, thereby preparing an ionized ligand. The alkyl halide may be provided to an imidazole group of the phenyl-imidazopyridine, thereby improving reactivity between the imidazole group and iridium of an iridium compound described below.

In addition, as described above, the alkyl halide may be bound to the imidazole group, in which an alkyl group of the alkyl halide may be provided to the imidazole group.

The homo-ligand iridium complex compound may be prepared by reacting the ionized ligand with an iridium compound. As shown in FIG. 2, the homo-ligand iridium complex compound may be prepared by a metalation reaction between the ionized ligand and iridium of the iridium compound. In other words, the homo-ligand iridium complex compound may be prepared by substituting a hydrogen element bound to a carbon element of the imidazole group of the ionized ligand with iridium of the iridium compound. Specifically, for example, the iridium compound may be any one selected from iridium (III) chloride hydrate (IrCl$_3$·nH$_2$O), bis(1,5-cyclooctadiene) diiridium (I)-dichloride, etc.

The homo-ligand iridium complex compound prepared as described above may be at least one stereoisomer from a facial isomer represented by <Formula 1> below or a meridional isomer represented by <Formula 2> below as shown in FIG. 3.

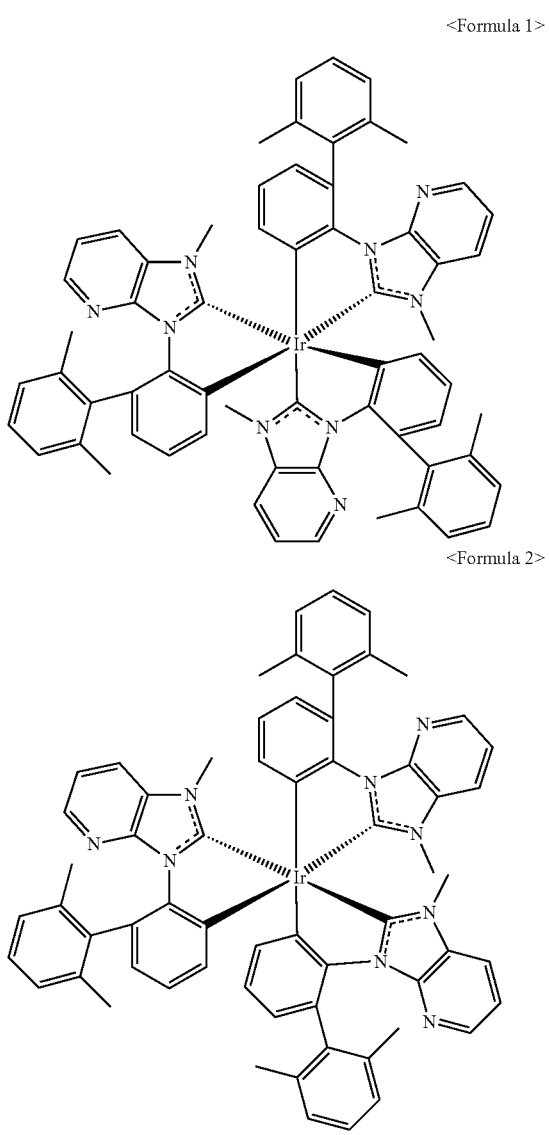

<Formula 1>

<Formula 2>

In this case, as shown in FIG. 3, the functional group may be vertically introduced into the phenyl group of the ligand, and thus the functional group may be introduced and a steric hindrance effect may be provided to the blue phosphorescent material.

Thus, a n-n*transition of the ligand may be increased, and the blue phosphorescent material may also have an absorption band at a wavelength region of 720 nm in a femtosecond time-resolved transient absorption spectrum. Accordingly, a maximum emission wavelength of the blue phosphorescent material may be shifted to a longer wavelength, while a phosphorescence lifetime of the blue phosphorescent material may be reduced at the same time. Specifically, for example, the blue light-emitting material may have a maximum emission peak at 515 to 555 nm at room temperature, and may have a maximum emission peak at 392 to 422 nm at a cryogenic temperature of 77K.

In addition, the blue phosphorescent material may emit light by an inter-ligand charge transfer (ILCT). In other words, a charge transfer between the imidazopyridine of the ligand and the phenyl group into which the functional group of the ligand is introduced may occur, and thus the blue phosphorescent material may emit light.

According to one embodiment, the blue phosphorescent material may include a carbon-carbon bond between the imidazopyridine of the ligand and the phenyl group of the ligand. The carbon-carbon bond may be rotated, and thus a bonding angle between a first plane including the imidazopyridine and a second plane including the phenyl group may change as shown in FIG. 3.

In this case, as an energy of the blue phosphorescent material increases, the bonding angle of the blue phosphorescent material may increase. Accordingly, as shown in FIG. 3, it can be seen that the bonding angle of the blue phosphorescent material having a singlet ground state $S_0$ is smaller than that of the blue phosphorescent material having a triplet $T_1$.

According to another embodiment, the blue phosphorescent material may be a hetero-ligand iridium complex compound represented by <Formula 3> below, which has the ligand as a main ligand and further includes an auxiliary ligand. The hetero-ligand iridium complex compound may be prepared by preparing an iridium dimer by reacting the iridium compound and the ligand prepared as described above; and reacting the iridium dimer and the auxiliary ligand (X-Y). Specifically, for example, the auxiliary ligand may be at least any one selected from acetylacetonate (acac), phenylpyridine, pyridylimidazole, etc.

<Formula 3>

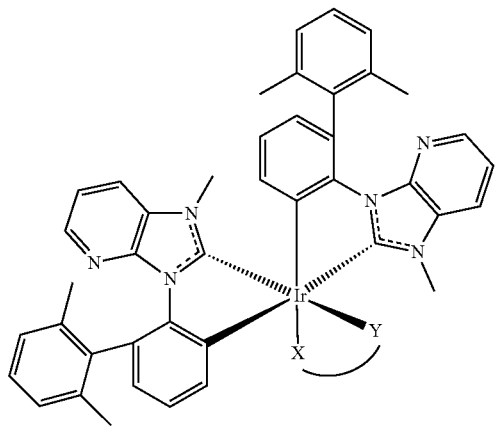

As described above, the prepared blue phosphorescent material may include: a central metal containing iridium; and the phenyl-imidazopyridine ligand which is coordinated by an iridium-carbon bond to the central metal and to which the sterically hindered functional group is introduced.

Specifically, the sterically hindered functional group may be introduced at an ortho position of the phenyl group of the ligand. Accordingly, a greater steric hindrance effect may be provided to the blue phosphorescent material as compared to a case in which the sterically hindered functional group is introduced at a meta or para position of the phenyl group.

As described above, the sterically hindered functional group may be introduced, a n-n*transition of the blue phosphorescent material may be increased, and thus an emission wavelength of the blue phosphorescent material may be increased.

According to one embodiment, as described above, the blue phosphorescent material may have the functional group having a large steric hindrance introduced and an intermolecular attraction between the blue phosphorescent materials may be weakened. Accordingly, a sublimation temperature of the blue phosphorescent material may be reduced. Thus, a time and cost required for the sublimation process may be reduced.

In addition, the blue phosphorescent material may have the functional group introduced, and solubility in an organic solvent may be increased. Accordingly, when the blue phosphorescent material is provided to a display device, a light emitting layer including the blue phosphorescent material may be easily prepared by a solution process. The solution process may be any one selected from gravure-coating, bar-coating, die-coating, etc.

Hereinafter, a specific method for preparing a blue phosphorescent material according to an embodiment of the present invention described above and the results of evaluating properties will be described.

Preparing of Blue Phosphorescent Material According to Experimental Examples 1 and 2

The 8.52 g (0.324 mol) of magnesium (Mg) was stirred for two hours in a nitrogen atmosphere, and activated by heat treatment at 50° C. 60 mL of tetrahydrofuran (THF) and 4.8 g (18.91 mmol) of iodine were mixed with the activated magnesium and mixed for 20 minutes to prepare a catalyst. 180 mL of tetrahydrofuran and 50.0 g (0.27 mol) of 2-bromo-1,3-dimethylbenzene were slowly added into the catalyst. After refluxing for one hour, the resulting mixture was cooled to −78° C., and 200 mL of tetrahydrofuran and 56.2 g (0.54 mol) of trimethyl borate were added. After that, the resulting mixture was stirred for one hour, cooled to room temperature, and stirred for 12 hours or more (overnight). Upon completion of the stirring, 200 mL of 1 M hydrochloric acid solution was added at 0° C., and stirred at room temperature for a period of time to carry out a reaction. The reaction-completed material was dissolved in diethyl ether, washed in an aqueous solution of sodium hydrogen carbonate, and dried over magnesium sulfate. After filtering the dried material, hexane was poured to remove impurities, so as to prepare 2,6-dimethylphenylboronic acid as a white powder.

13.97 g (93.14 mmol) of the 2,6-dimethylphenylboronic acid, 12 g (54.79 mmol) of 2-iodoaniline, 2.5 g(3.83 mmol) of tris(dibenzylideneacetone)dipalladium(0) (Pd$_2$(dba)$_3$) 2.3 g(7.67 mmol) of 2-dicyclohexylphosphino-2',6'-dimethoxybiphenyl(SPhos), and 22.72 g (164.37 mmol) of potassium carbonate (K$_2$CO$_3$) were mixed in a solvent of 140 mL of acetonitrile (CH$_3$CN) and 90 mL of distilled water. After refluxing for 20 hours, the resulting mixture was cooled to room temperature, 400 mL of ethyl acetate and 300 mL of distilled water were poured to separate the ethyl acetate layer with a separatory funnel. The separated ethyl acetate layer was dried over magnesium sulfate, and concentrated in an evaporator to obtain a product, which was then subjected to silica gel chromatography. In this case, 2',6'-dimethylbiphenyl-2-amine was prepared by using ethyl acetate:n-hexane at a volume ratio of 1:3 as a developing solution.

12 g (60.82 mmol) of the 2',6'-dimethylbiphenyl-2-amine, 10.6 g (66.90 mmol) of 2-chloro-3-nitropridine and 200 mL of ethylene glycol were mixed and stirred at 140° C. for 10 hours. After cooling to room temperature, the resulting solution was extracted with a separatory funnel as described above by using a solvent of 300 mL of ethyl acetate and 300 mL of distilled water, and subjected to silica gel chromatography. In this case, N-(2',6'-dimethylbiphenyl-2-yl)-3-nitropyridin-2-amine was prepared by using ethyl acetate: n-hexane at a volume ratio of 1:1 as a developing solution.

7 g (21.92 mmol) of the N-(2',6'-dimethylbiphenyl-2-yl)-3-nitropyridin-2-amine, 17.59 g (0.33 mol) of ammonium chloride, 18.36 g (0.33) mol of iron (Fe), and 250 mL of 2-propanol were mixed, and then 250 mL of formic acid was added. After stirring at 100° C. for 24 hours in a stirrer, the precipitate was filtered. The precipitate was neutralized with an aqueous solution of sodium hydrogen carbonate, and then extracted with ethyl acetate. The extracted precipitate was subjected to silica gel chromatography. In this case, 3-(2', 6'-dimethylbiphenyl-2-yl)-3H-imidazo [4,5-b]pyridine was prepared by using ethyl acetate:n-hexane at a volume ratio of 1:3 as a developing solution.

17.37 g (0.12 mol) of iodomethane ($CH_3I$) was added to a mixture of 7.33 g (24.48 mmol) of the 3-(2',6'-dimethyl-biphenyl-2-yl)-3H-imidazo [4,5-b]pyridine and 70 mL of tetrahydrofuran. After refluxing for 48 hours, the resulting mixture was cooled to room temperature to produce a precipitate, which was then filtered and washed with 200 mL of tetrahydrofuran. The washed precipitate was dried in a vacuum oven to prepare a ligand precursor.

3 g (6.8 mmol) of the ligand precursor, 0.76 g (1.13 mmol) of bis(1,5-cyclooctadiene)diiridium (I)-dichloride, 0.79 g (3.4 mmol) of silver oxide, and 30 mL of dimethylformamide (DMF) were mixed and refluxed for 24 hours. After completion of the reaction according to the reflux process, the resulting reaction solution was cooled to room temperature and filtered. The filtered reactant was provided to a rotary evaporator to remove the solvent, and then extracted with 200 mL of dichloromethane and 200 mL of distilled water. The extracted reactant was dried over magnesium sulfate, after which two isomers were separated through silica gel chromatography. In this case, the blue phosphorescent material (facial isomer) according to Experimental Example 1 represented by the above <Formula 1> and the blue phosphorescent material (meridional isomer) according to Experimental Example 2 represented by the above <Formula 2> were prepared by using dichloromethane:n-hexane at a volume ratio of 2:1 as a developing solution.

Preparing of Blue Phosphorescent Material According to Comparative Examples 1 and 2

The blue phosphorescent material (facial isomer) according to Comparative Example 1 represented by <Formula 4> below and the blue phosphorescent material (meridional isomer) according to Comparative Example 2 represented by <Formula 5> below were prepared by the same method as in the blue phosphorescent material according to Experimental Examples 1 and 2 described above, but without the preparing of 2,6-dimethylphenylboronic acid, thereby mixing aniline instead of 2-iodoaniline without adding the 2,6-dimethylphenylboronic acid in the preparing of 2',6'-dimethylbiphenyl-2-amine.

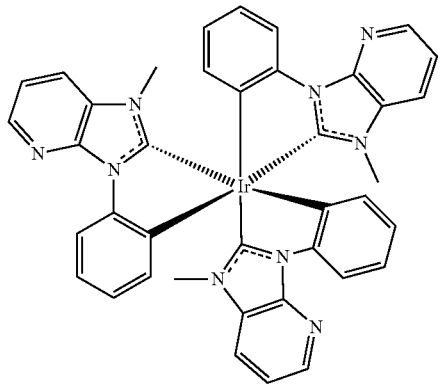

<Formula 4>

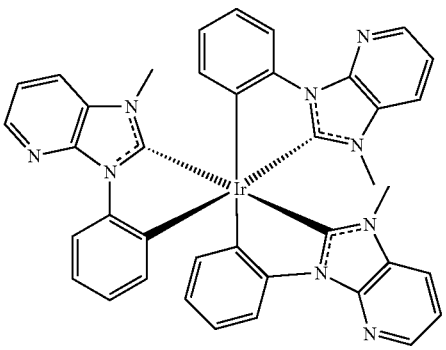

<Formula 5>

Ligands and isomers of the blue phosphorescent materials according to Comparative Examples 1 and 2, and Experimental Examples 1 and 2 as described above are shown in <Table 1> below.

TABLE 1

| | Ligand | Isomer |
|---|---|---|
| Comparative Example 1 | pmp | facial (far) |
| Comparative Example 2 | pmp | meridional (mer) |
| Experimental Example 1 | dmpmp | facial (far) |
| Experimental Example 2 | dmpmp | meridional (mer) |

Figure 4:
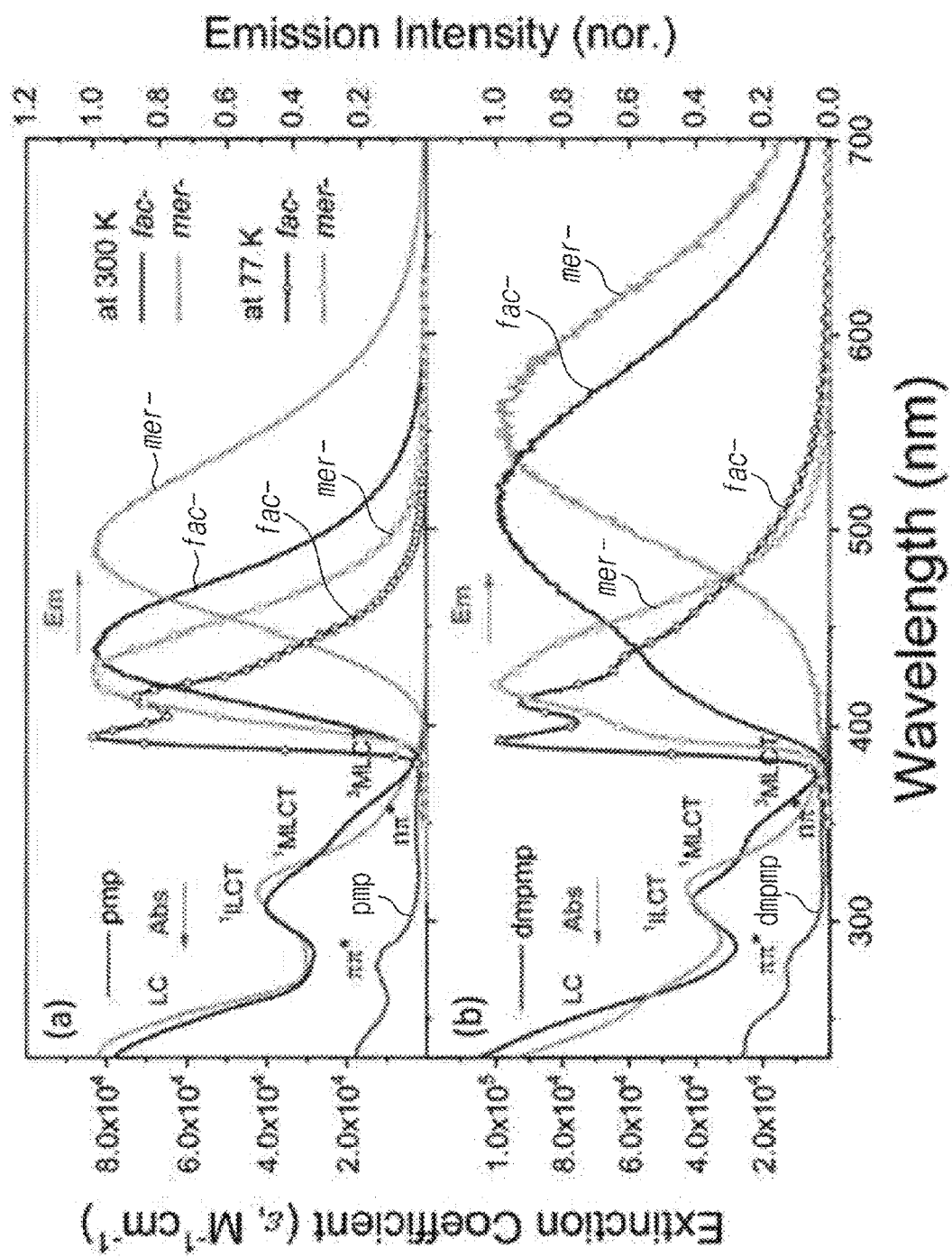
FIG. 4 is a graph showing an absorption and emission spectrum of a blue phosphorescent material according to an embodiment of the present invention.

FIG. 4 is a graph showing an absorption and emission spectrum of a blue phosphorescent material according to an embodiment of the present invention. Referring to FIG. 4, a maximum wavelength of absorption and emission, a decay rate constant for luminescence and non-luminescence, phosphorescence efficiency, etc., at room temperature (300K) and cryogenic temperature (77K) of the blue phosphorescent materials according to Comparative Examples 1 and 2, and Experimental Examples 1 and 2 of the present invention are shown in <Table 1> below.

TABLE 2

| | 300K | | | | | | 77K | |
|---|---|---|---|---|---|---|---|---|
| | $\lambda_{abs}$ (nm) | $\lambda_p$ (nm) | $\tau_p$ (µs) | $\varphi_p$ (%) | $k_r$ (s$^{-1}$) | $k_{nr}$ (s$^{-1}$) | $\lambda_p$ (nm) | $\tau_p$ (µs) |
| Comparative Example 1 | 306, 342 | 440 | 1.20 | 76 | 6.33 × 10$^5$ | 1.99 × 10$^5$ | 394 | 2.2 (40), 6.96 (60) |
| Comparative Example 2 | 316 | 490 | 0.80 | 78 | 9.75 × 10$^5$ | 2.75 × 10$^5$ | 426 | 1.29 |
| Experimental Example 1 | 310, 342 | 515 | 0.17 | 3 | 1.76 × 10$^5$ | 5.87 × 10$^6$ | 392 | 1.04 (64), 2.58 (36) |
| Experimental Example 2 | 317 | 555 | 3.7 ns | 0.1 | 2.70 × 10$^5$ | 2.70 × 10$^8$ | 422 | 1.36 |

As shown in FIG. 4, a ligand (pmp) of the blue phosphorescent materials according to Comparative Examples 1 and 2 showed an absorption peak at 277 and 235 nm, in which an extinction coefficient showed a value of 12,500 and 17,200M$^-$cm$^{-1}$. A ligand (dmpmp) of the blue phosphorescent materials according to Experimental Examples 1 and 2 showed an absorption spectrum similar to that of the ligand (pmp). In contrast, it was confirmed that the ligand (dmpmp) shows an absorption peak of 25, 300M$^{-1}$cm$^{-1}$ at 240 nm. Accordingly, it can be confirmed that a n-n*transition of the ligand (dmpmp) becomes stronger due to the 2,6-dimethylphenyl functional group. As can be understood from (a) of FIG. 4 and <Table 2>, it was confirmed that the blue phosphorescent materials according to Comparative Examples 1 and 2 have a n-n*transition (LC) at 310 nm, a charge transfer ($^1$MLCT) between spin-allowed metal-ligands at 342 nm, and a charge transfer ($^3$MLCT) between spin-forbidden metal-ligands at 390 nm. In this case, it could be seen that the charge transfer between spin-forbidden metal-ligands appears to be mixed with a weak inter-ligand charge transfer (ILCT) around 385 nm.

It was confirmed that the blue phosphorescent materials according to Experimental Examples 1 and 2 as shown in (b) of FIG. exhibit an absorption spectrum similar to that of the blue phosphorescent material as shown in (a) of FIG. 4. It was confirmed that the blue phosphorescent materials according to Experimental Examples 1 and 2 exhibit a n-n*transition (LC) at 310 nm, in which an extinction coefficient is 42,000M$^{-1}$cm$^{-1}$. Accordingly, it can be seen that the functional group hardly acts to increase a length of conjugation of the phenyl-imidazopyridine group. In contrast, considering that the extinction coefficient is slightly improved at 230 nm, an increase in the n-n*transition (LC) due to the functional group was partially confirmed. In addition, it was confirmed that a charge transfer ($^1$MLCT) between the spin-allowed metal-ligands appears at 342 nm and a weak tail-type absorption appears at 385 nm. In contrast, the charge transfer ($^3$MLCT) between spin-forbidden metal-ligands was hardly observed, which was then confirmed to have 397 and 415 nm, respectively, by a time-dependent density functional theory (TD-DFT).

It was observed that, unlike the absorption spectrum, the emission spectrum shows different properties for each isomer. It was confirmed that the blue phosphorescent materials according to Comparative Example 1 and Experimental Example 1, that is, a facial isomer exhibits a 0-0 vibronic peak at 394 and 392 nm and a 0-1 vibronic peak at 414 and 412 nm, respectively, at a temperature of 77K. In contrast, it was confirmed that the blue phosphorescent materials according to Comparative Example 2 and Experimental Example 2, that is, a meridional isomer exhibits a maximum emission peak at 426 and 422 nm, respectively, at a temperature of 77K. Thus, it can be seen that the meridional isomer emits light at a longer wavelength than that of the facial isomer.

As shown in (a) of FIG. 4, it was confirmed that the blue phosphorescent materials according to Comparative Examples 1 and 2 exhibit an emission peak at 440 and 490 nm, respectively, at a temperature of 300K. It was confirmed that the blue phosphorescent materials according to Experimental Examples 1 and 2 as shown in (b) of FIG. 4 have emission peaks of 515 and 555 nm, respectively, at a temperature of 300K. Accordingly, it was confirmed that the emission peak at 300K is shifted to a longer wavelength than that of the emission peak at 77K.

As can be understood from <Table 2>, it was confirmed that a phosphorescent quantum efficiency ($(\varphi_p)$) of the blue phosphorescent materials according to Comparative Examples 1 and 2 is 75% or more and a phosphorescence lifetime ($\tau_p$) is 1.2 and 0.8 µs, respectively, at a temperature of 300 K. In contrast, it was confirmed that the phosphorescent quantum efficiency and the phosphorescence lifetime are decreased in the blue phosphorescent materials according to Experimental Examples 1 and 2.

However, it was confirmed that all of the iridium compounds have a value of several µs at a temperature of 77K. Accordingly, it can be seen that the blue phosphorescent materials according to Experimental Examples 1 and 2 have phosphorescence rapidly decay as a temperature increases.

Referring to <Table 2>, a luminescence decay rate constant ($k_r$) and a non-luminescence decay rate constant ($k_{nr}$) of the blue phosphorescent material are shown. In this case, the luminescence decay rate constant and the non-luminescence decay rate constant may be calculated by <Equation 1> and <Equation 2> below, respectively.

$$k_r = \frac{\phi_p}{\tau_p} \qquad \langle\text{Equation 1}\rangle$$

$$k_{nr} = \frac{k_r}{\phi_p} - k_r \qquad \langle\text{Equation 2}\rangle$$

It can be seen that the blue phosphorescent materials according to Comparative Examples 1 and 2 have the luminescence decay rate constant greater than the non-luminescence decay rate constant. Accordingly, it was confirmed that the blue phosphorescent material has superiority in luminescence over non-luminescence. In contrast, it was confirmed that the blue phosphorescent materials according to Experimental Examples 1 and 2 have superiority in luminescence over non-luminescence. It was confirmed that an emission wavelength of the blue phosphorescent materials according to Experimental Examples 1 and 2 is shifted to a longer wavelength than that of the blue phosphorescent materials according to Comparative Examples 1 and 2, and thus a non-luminescence decay rate constant is increased by an energy gap law.

Figure 5:
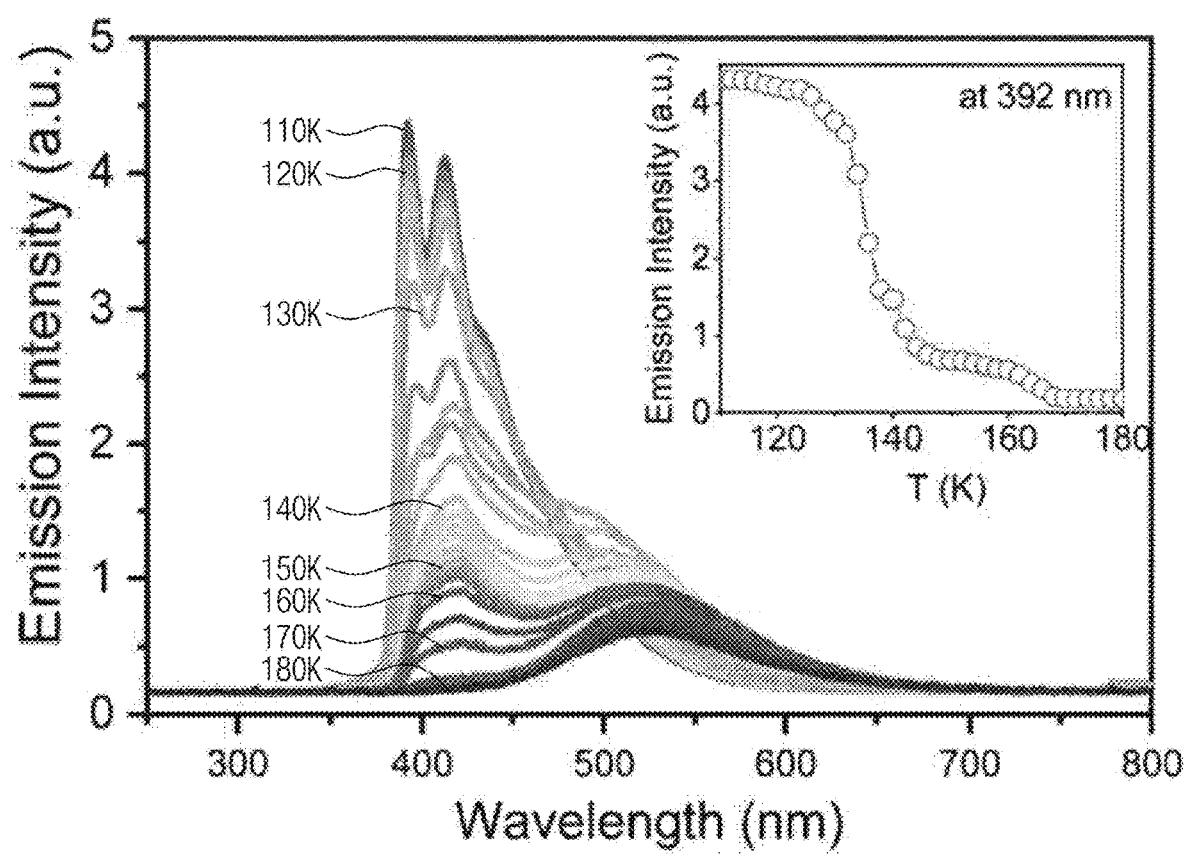
FIG. 5 is a graph showing an emission spectrum depending on a temperature of a blue phosphorescent material according to Experimental Example 1 of the present invention.
Figure 6:
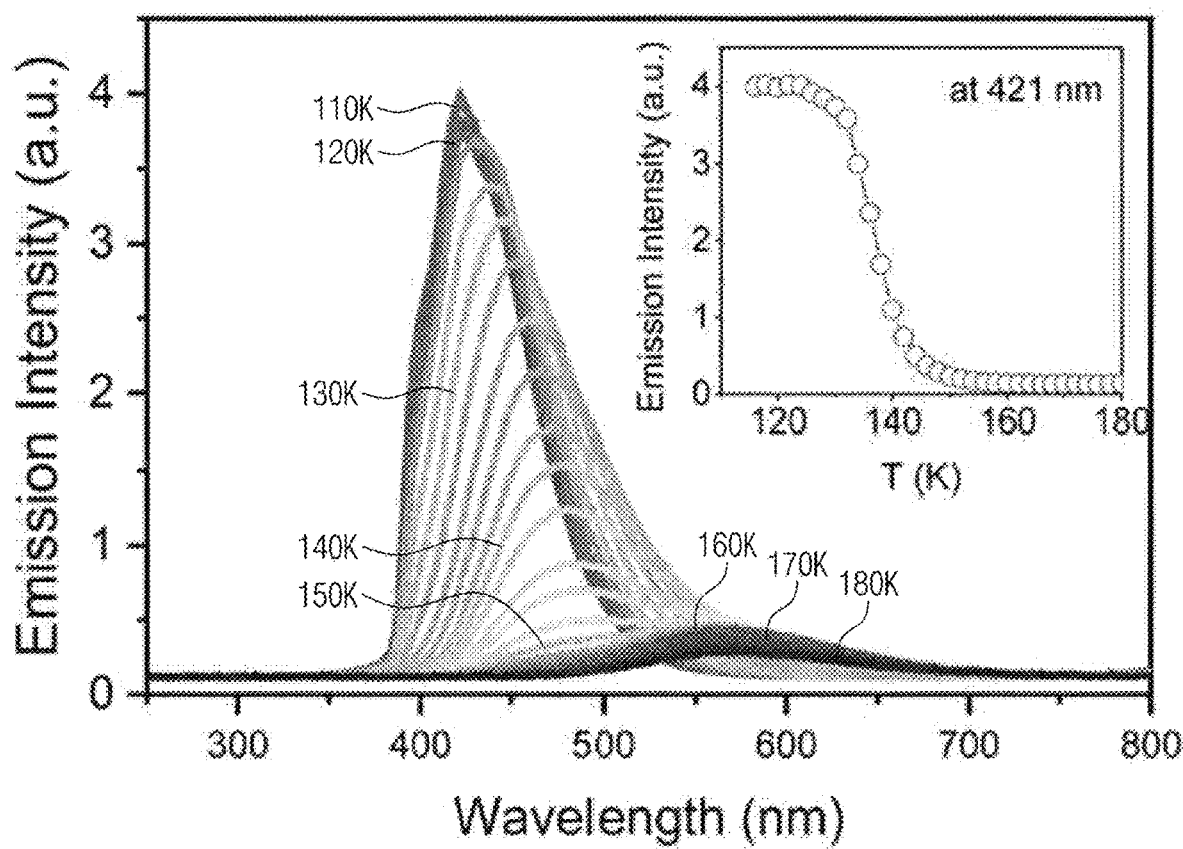
FIG. 6 is a graph showing an emission spectrum depending on a temperature of a blue phosphorescent material according to Experimental Example 2 of the present invention.

FIG. 5 is a graph showing an emission spectrum depending on a temperature of a blue phosphorescent material according to Experimental Example 1 of the present invention, and FIG. 6 is a graph showing an emission spectrum depending on a temperature of a blue phosphorescent material according to Experimental Example 2 of the present invention.

Referring to FIG. 5, it was confirmed that the blue phosphorescent material according to Experimental Example 1 has a strong vibration structure at a low temperature. In contrast, it was confirmed that the blue phosphorescent material according to Experimental Example 2, as shown in FIG. 6, has a relatively weak vibration structure.

As shown in FIGS. 5 and 6, it can be seen that the blue phosphorescent materials according to Experimental Examples 1 and 2 have a weaker vibration structure, as a temperature increases. In this case, the emission spectrum at a point of contraflexure in a change of the vibration structure can be confirmed in graphs shown in FIGS. 5 and 6. It can be seen that the point of contraflexure is a melting point of 2-methylhydrofuran (2-MeTHF), a solvent used for measuring the emission spectrum, and thus an arrangement of the blue phosphorescent material is changed according to an external environment of the blue phosphorescent material.

Figure 7:
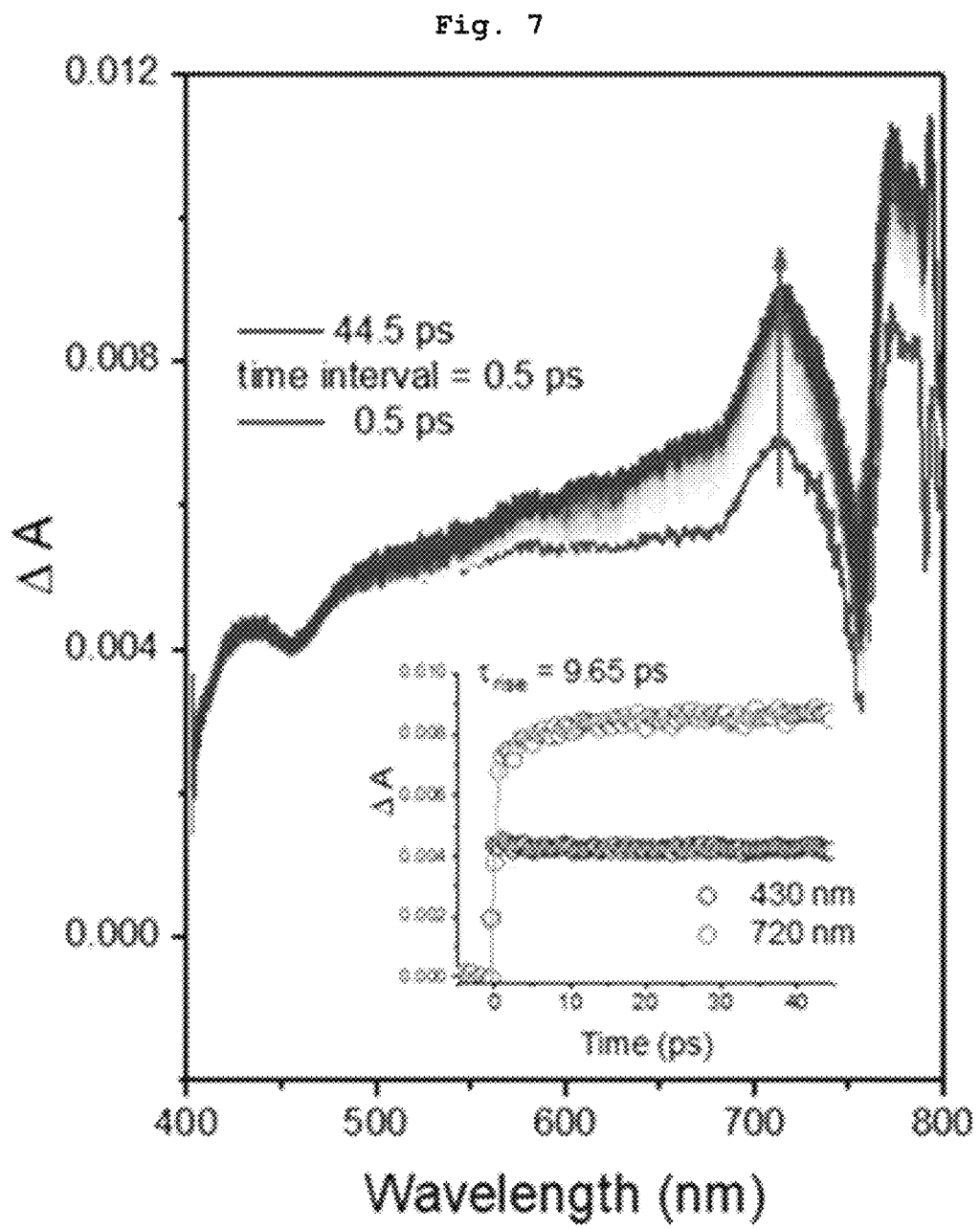
FIG. 7 is a graph showing a femtosecond time-resolved transient absorption spectrum of a blue phosphorescent material according to Experimental Example 1 of the present invention.
Figure 8:
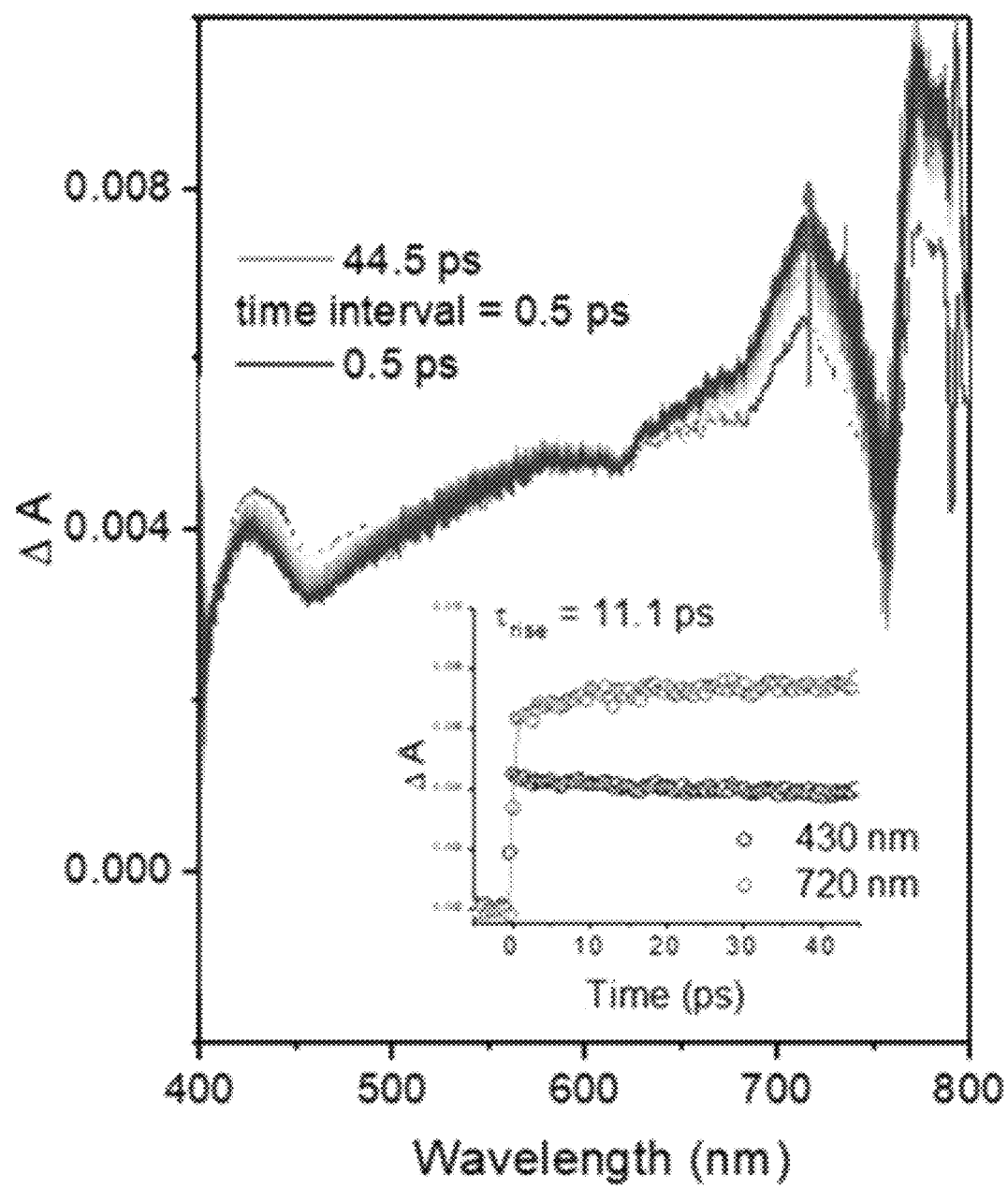
FIG. 8 is a graph showing a femtosecond time-resolved transient absorption spectrum of a blue phosphorescent material according to Experimental Example 2 of the present invention.
Figure 9:
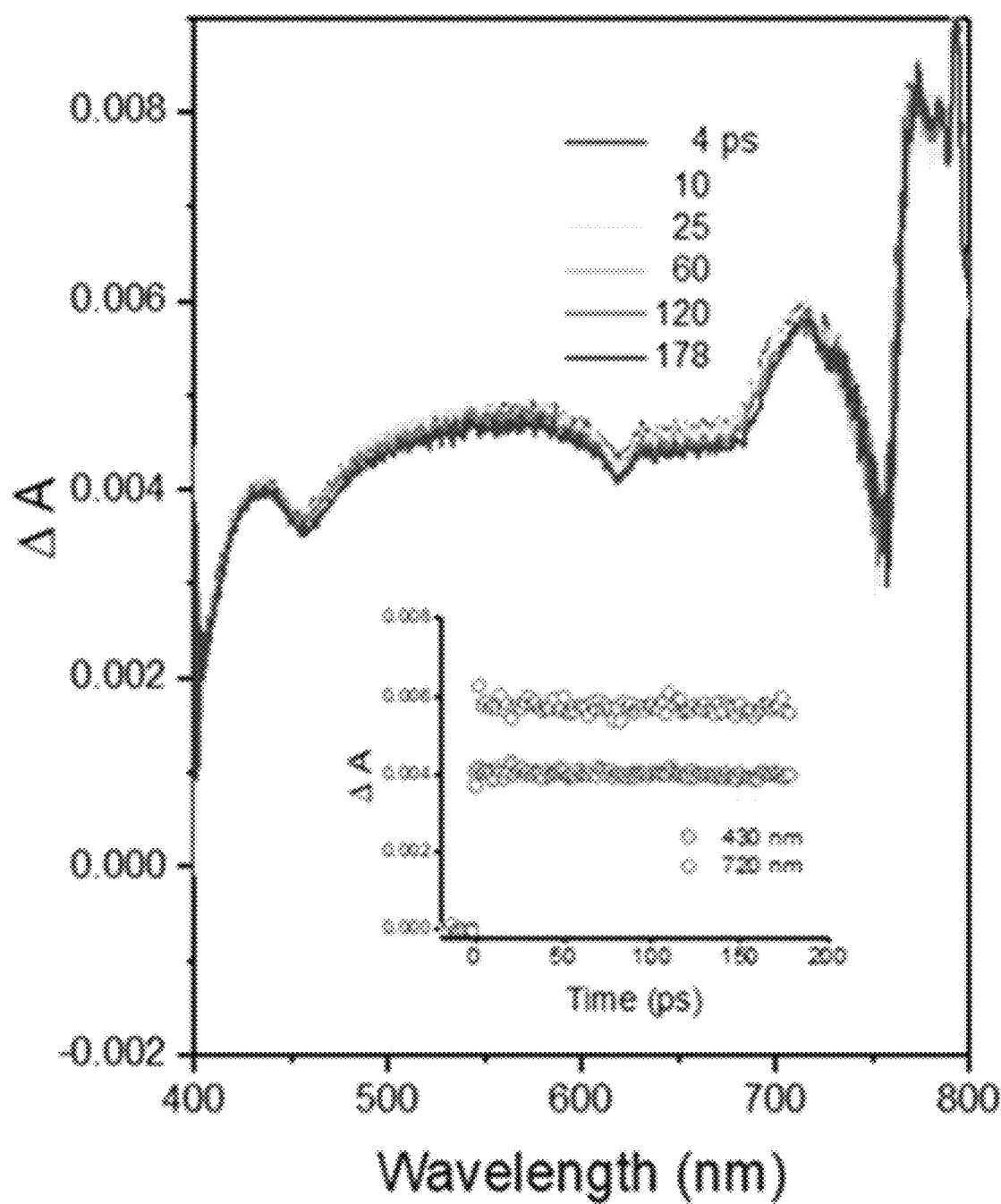
FIG. 9 is a graph showing a femtosecond time-resolved transient absorption spectrum of a blue phosphorescent material according to Comparative Example 1 of the present invention.
Figure 10:
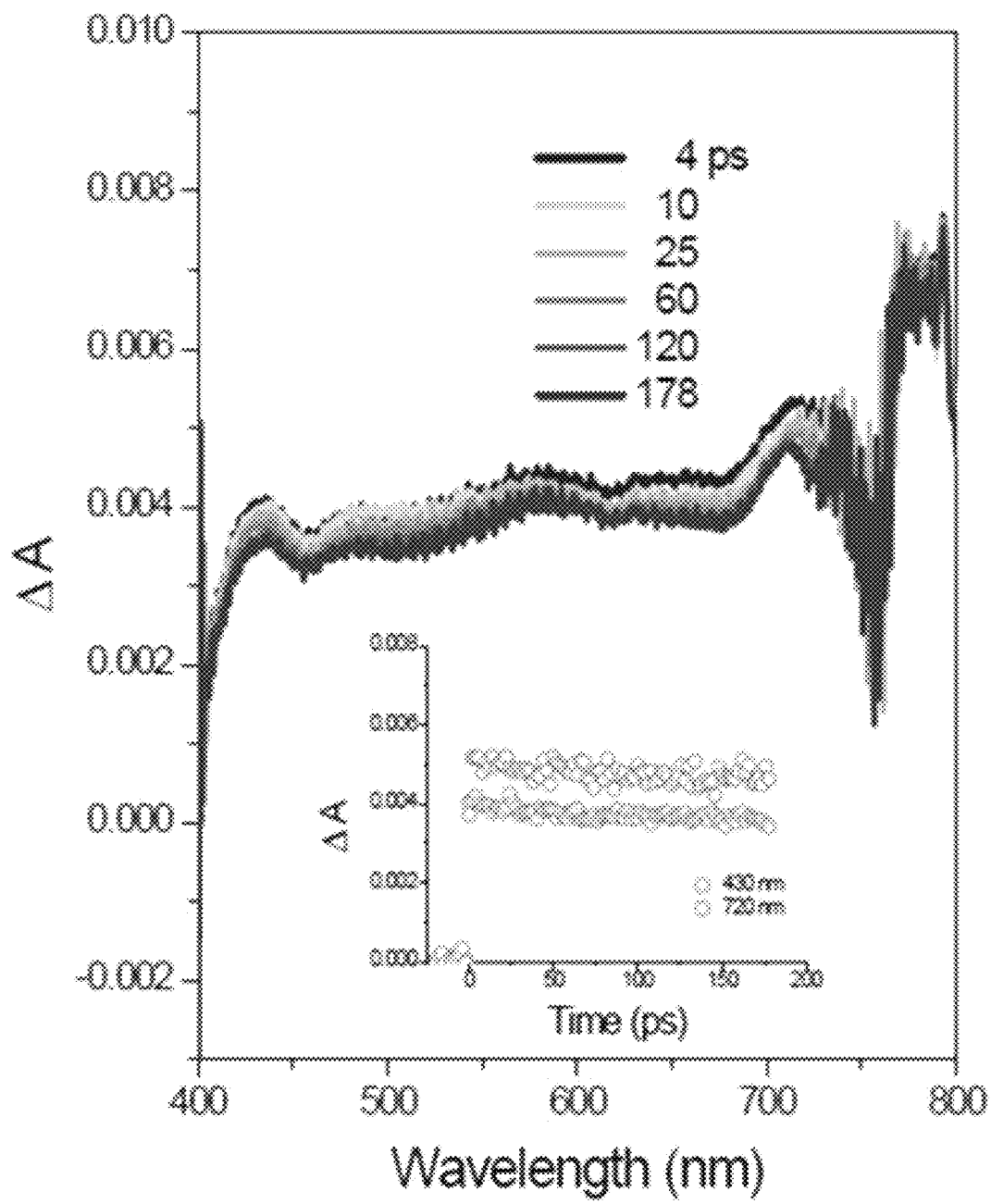
FIG. 10 is a graph showing a femtosecond time-resolved transient absorption spectrum of a blue phosphorescent material according to Comparative Example 2 of the present invention.

FIG. 7 is a graph showing a femtosecond time-resolved transient absorption spectrum of a blue phosphorescent material according to Experimental Example 1 of the present invention, FIG. 8 is a graph showing a femtosecond time-resolved transient absorption spectrum of a blue phosphorescent material according to Experimental Example 2 of the present invention, FIG. 9 is a graph showing a femtosecond time-resolved transient absorption spectrum of a blue phosphorescent material according to Comparative Example 1 of the present invention, and FIG. 10 is a graph showing a femtosecond time-resolved transient absorption spectrum of a blue phosphorescent material according to Comparative Example 2 of the present invention.

Referring to FIGS. 7 and 8, it was confirmed that the blue phosphorescent materials according to Experimental Examples 1 and 2 exhibit a band-shaped absorption spectrum at a visible ray region of 430 to 720 nm. In this case, a time at which the absorption spectrum appears at 430 and 720 nm (pump-probe time difference) was observed and confirmed with an inserted graph. It was confirmed that the blue phosphorescent materials according to Experimental Examples 1 and 2 show the pump-probe time difference of 9.65 and 11.1 ps, respectively, at 720 nm. In contrast, it was confirmed that the time difference does not appear at 430 nm.

In contrast, it was confirmed that the band-shaped absorption spectrum is not observed from the blue phosphorescent materials according to Comparative Examples 1 and 2 as shown in FIGS. 9 and 10. In other words, it was confirmed for the blue phosphorescent material that the absorption spectrum is substantially constant, despite an increasing time at which the absorption spectrum is observed with the probe after excitation by the pump. Accordingly, it could be seen that it takes along time for the blue phosphorescent material to fall to a ground state after rapid excitation. It was confirmed for the blue phosphorescent material that the band-shaped absorption spectrum is observed in several ns. Accordingly, as described above with reference to <Table 2>, it can be seen that the blue phosphorescent material has a phosphorescence lifetime longer than that of the blue phosphorescent material according to Experimental Examples 1 and 2.

Figure 11:
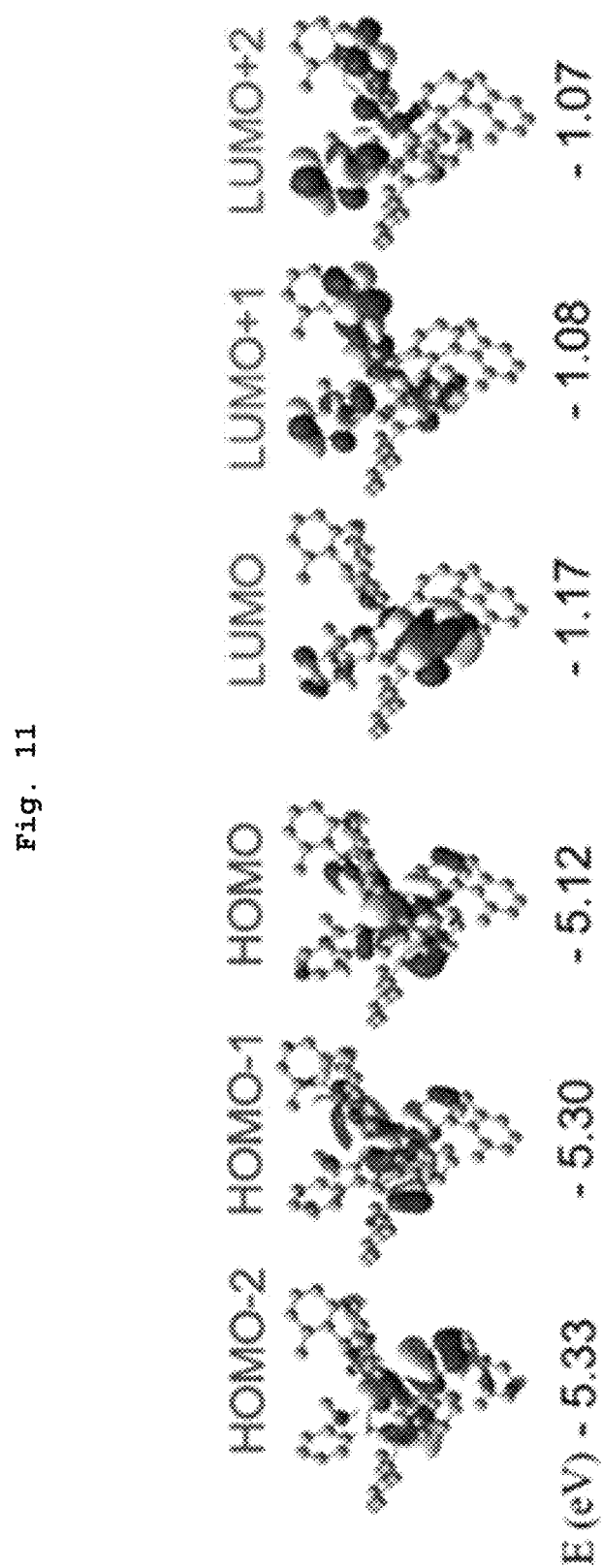
FIG. 11 is a view showing a frontier molecular orbital of a blue phosphorescent material according to Experimental Example 1 of the present invention.
Figure 12:
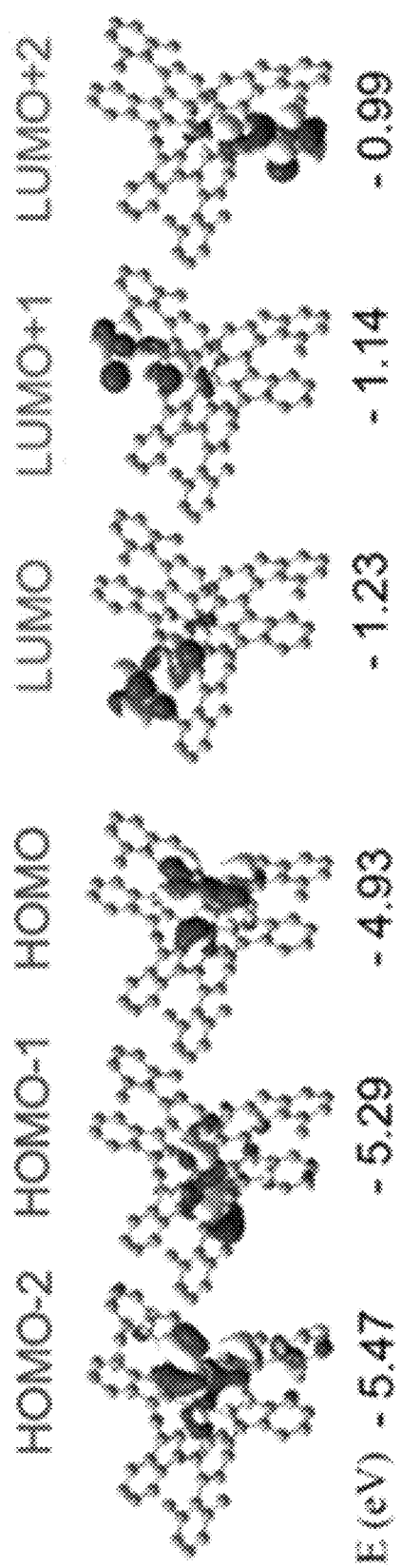
FIG. 12 is a view showing a frontier molecular orbital of a blue phosphorescent material according to Experimental Example 2 of the present invention.
Figure 13:
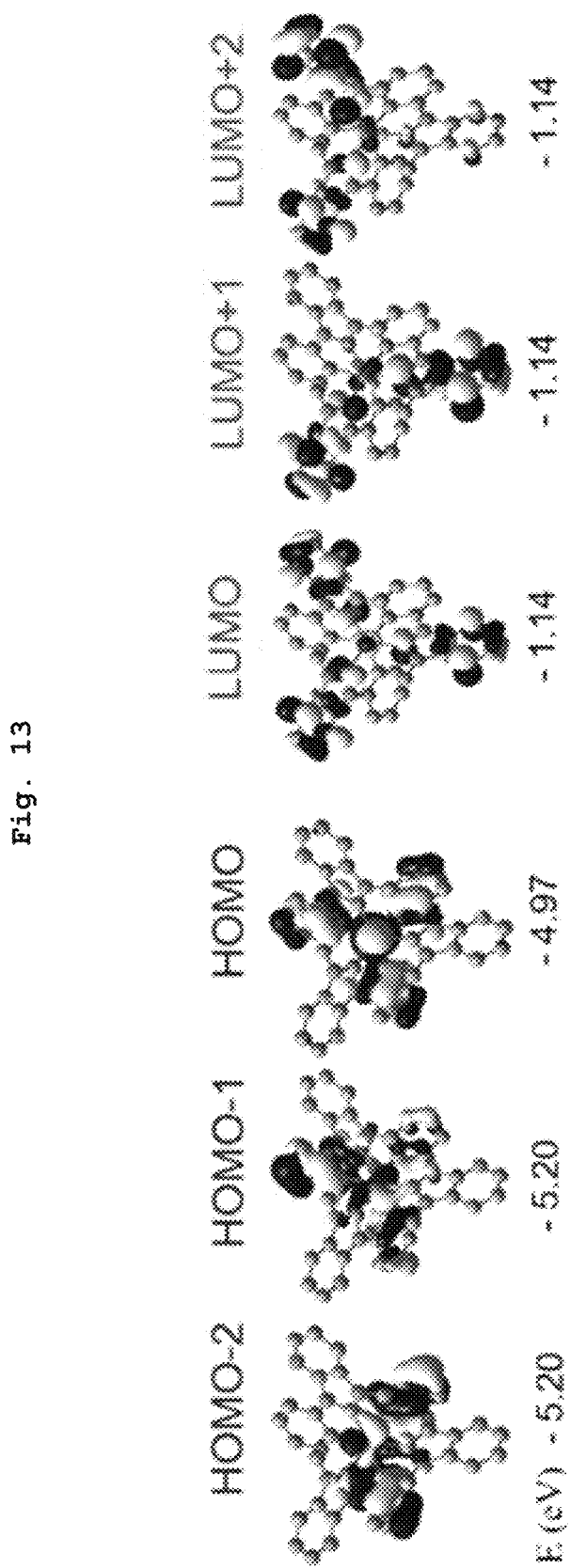
FIG. 13 is a view showing a frontier molecular orbital of a blue phosphorescent material according to Comparative Example 1 of the present invention.
Figure 14:
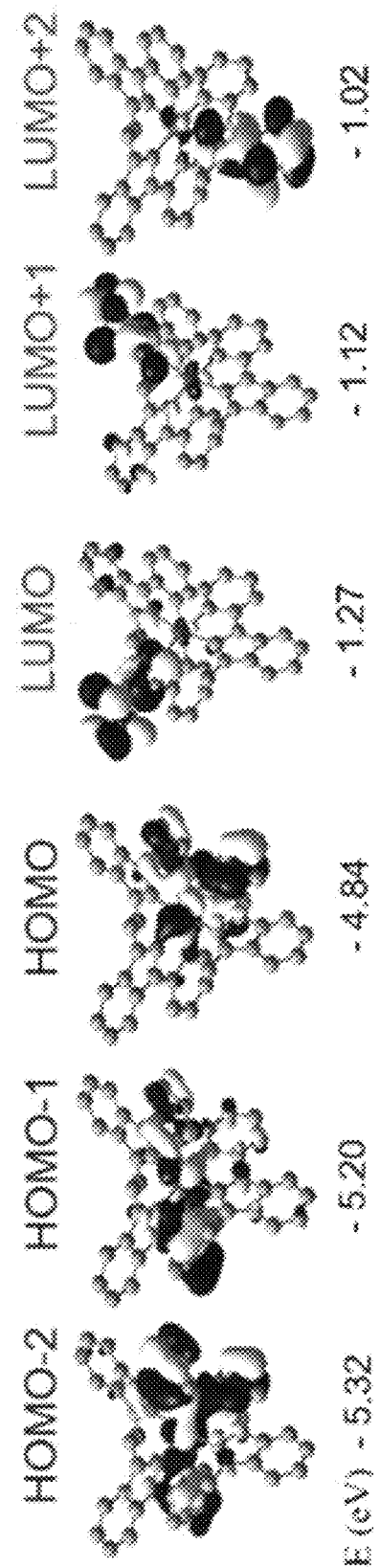
FIG. 14 is a view showing a frontier molecular orbital of a blue phosphorescent material according to Comparative Example 2 of the present invention.

FIG. 11 is a view showing a frontier molecular orbital of a blue phosphorescent material according to Experimental Example 1 of the present invention, FIG. 12 is a view showing a frontier molecular orbital of a blue phosphorescent material according to Experimental Example 2 of the present invention, FIG. 13 is a view showing a frontier molecular orbital of a blue phosphorescent material according to Comparative Example 1 of the present invention, and FIG. 14 is a view showing a frontier molecular orbital of a blue phosphorescent material according to Comparative Example 2 of the present invention.

Referring to FIG. 11, it can be seen that a highest occupied molecular orbital of the blue phosphorescent material (facial isomer) according to Experimental Example 1 is distributed in an iridium metal and the phenyl group of the ligand. In this case, it can be seen that the iridium metal is bound to the three ligands, and thus a n-orbital of the phenyl group and the iridium metal is distributed in two other extended highest occupied molecular orbitals (HOMO-1 and HOMO-2). At this time, it can be seen that the three highest occupied molecular orbitals show a difference of 0.21 eV. It can be seen that the two highest occupied molecular orbitals among the three highest occupied molecular orbitals are partially distributed in imidazopyridine.

In contrast, it can be seen that a highest occupied molecular orbital of the blue phosphorescent material (facial isomer) according to Comparative Example 1 as shown in FIG. 13 is distributed only in the iridium metal and the phenyl group, and the three highest occupied molecular orbitals have a symmetry to $C_3$.

Accordingly, it can be seen that the blue phosphorescent material (facial isomer) further includes the functional group (Comparative Example 1 vs. Experimental Example 1) and has a steric hindrance, and thus the highest occupied molecular orbital loses symmetry. In this case, it was confirmed that the same trend occurs to even a lowest occupied molecular orbital of the blue phosphorescent material (facial isomer).

In contrast, referring to FIGS. 12 and 14, it can be seen that a molecular orbital of the blue phosphorescent material (meridional isomer) according to Experimental Example 2 and Comparative Example 2 has a symmetry to $C_1$. In this case, it was confirmed to have two cis-type (cisoid) distributions and one trans-type (transoid) distribution.

Figure 15:
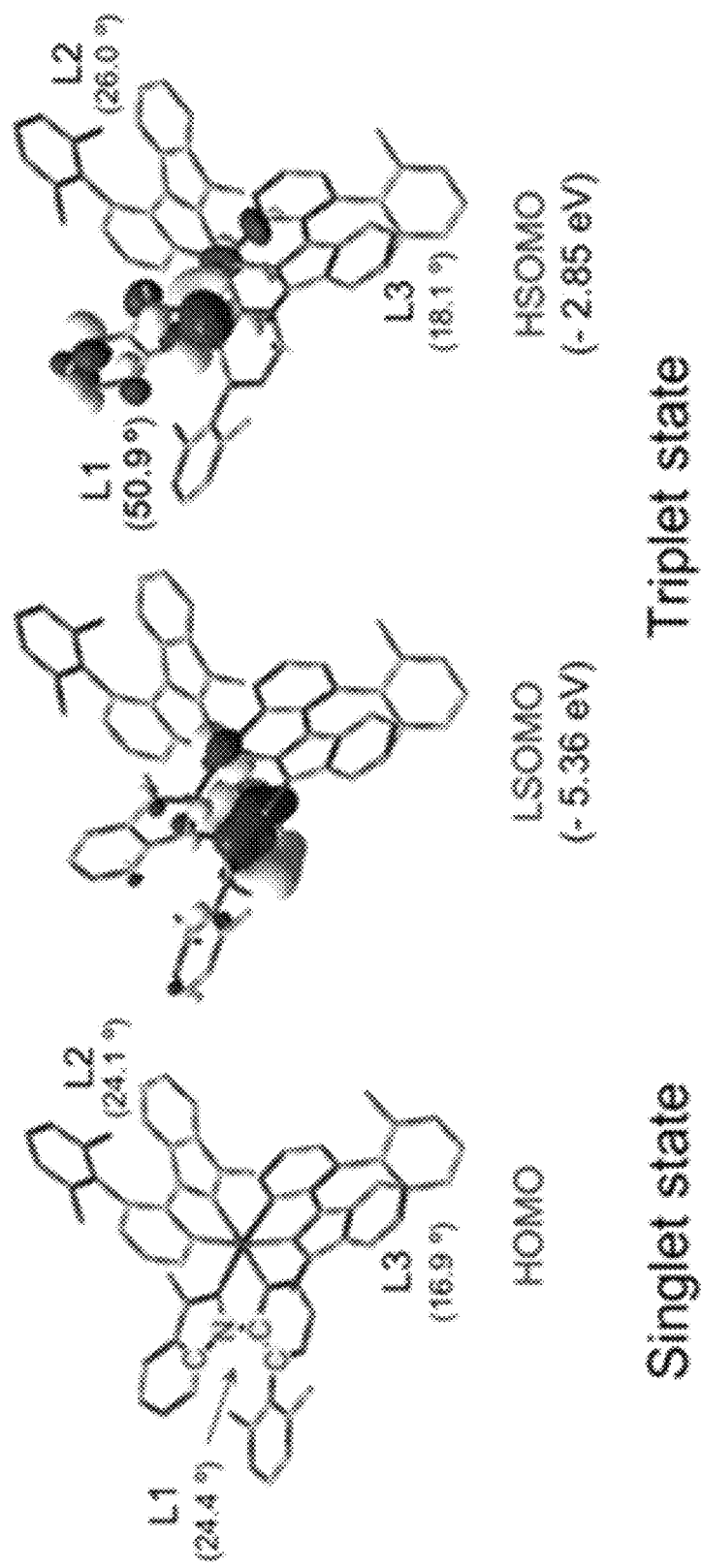
FIG. 15 is a view showing a frontier molecular orbital of singlet and triplet of a blue phosphorescent material according to Experimental Example 1 of the present invention.
Figure 16:
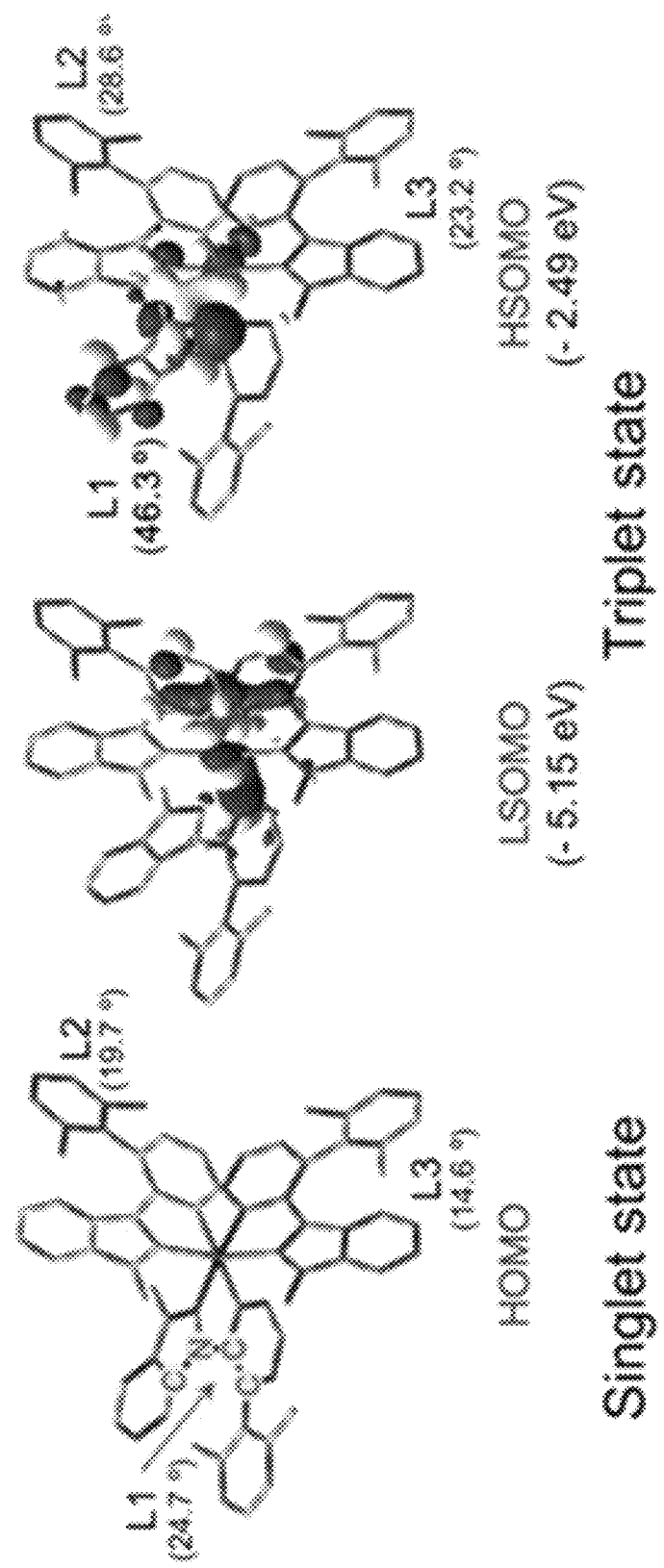
FIG. 16 is a view showing a frontier molecular orbital of singlet and triplet of a blue phosphorescent material according to Experimental Example 2 of the present invention.

FIG. 15 is a view showing a frontier molecular orbital of singlet and triplet of a blue phosphorescent material according to Experimental Example 1 of the present invention, and FIG. 16 is a view showing a frontier molecular orbital of singlet and triplet of a blue phosphorescent material according to Experimental Example 2 of the present invention.

Referring to FIGS. 15 and 16, it can be seen that an excited state triplet of the blue phosphorescent material has a singly occupied highest molecular orbital (HSOMO) and a singly occupied lowest molecular orbital (LSOMO). Herein, it can be seen that the singly occupied highest molecular orbital is distributed in the imidazopyridine, and the singly occupied lowest molecular orbital is distributed in the iridium metal and the phenyl group.

In this case, referring to FIGS. 12 and 14, a value ($E_{g,T-S}$) of an energy difference between an excited state triplet ($T_1$) and a ground state singlet ($S_0$) of the blue phosphorescent materials according to Experimental Examples 1 and 2 was calculated. Accordingly, it was confirmed that the value ($E_{g,T-S}$) of the energy difference is 3.95 and 3.70 eV, respectively. It was confirmed that the value of the energy difference ($E_{g,T-S}$) corresponds to a difference between maximum absorption and emission wavelengths of the blue phosphorescent material at the temperature of 77 K described above with reference to FIG. 4.

In contrast, unlike the theoretically calculated value of the energy difference ($E_{g,T-S}$) as described above, it can be seen that the value of the energy difference ($E_{g,T-S}$) according to an optimized structure is 2.27 and 2.44 eV, respectively. It can be seen that the value ($E_{g,T-S}$) of the energy difference (Eg,T-S) corresponds to a difference between maximum absorption and emission wavelengths of the blue phosphorescent material at the temperature of 300 K. Accordingly, it can be seen that an optimized structure of the triplet is different from an optimized structure in a ground state.

As shown in FIGS. 15 and 16, it can be seen that the substituent is vertically bound to the phenyl group. In this case, it can be seen that a carbon element of the substituent is adjacent to a nitrogen element of the phenyl ring of the imidazopyridine. In the blue phosphorescent materials according to Experimental Examples 1 and 2, it was confirmed that a distance between the carbon element and the nitrogen element in a singlet state is 2.852 to 2.880 Å and 2.861 to 2.884 Å, respectively. In contrast, it can be seen that the distance in a triplet state is 3.073 and 3.057 Å, respectively.

In this case, an angle (D) of carbon-nitrogen-carbon-carbon bond (C—N—C—C bonds as shown in FIGS. 15 and 16) of a phenyl group and imidazopyridine, a distance ($R_1$) between carbons of the iridium metal and the phenyl group, and a distance ($R_2$) between carbons of the iridium metal and the imidazopyridine in each ligand of the blue phosphorescent materials according to Experimental Examples 1 and 2 are shown in <Table 3> below.

TABLE 3

|  | Ligands | Singlet | | Triplet | |
| --- | --- | --- | --- | --- | --- |
|  |  | D(°) | $R_1 / R_2$ (Å) | D(°) | $R_1 / R_2$ (Å) |
| Experimental Example 1 | L1 | 21.4 | 2.048/2.109 | 50.9 | 2.116/2.110 |
|  | L2 | 24.1 | 2.067/2.115 | 26.0 | 2.071/2.048 |
|  | L3 | 16.9 | 2.047/2.113 | 18.1 | 2.127/2.138 |
| Experimental Example 2 | L1 | 24.7 | 2.075/2.140 | 46.3 | 2.325/2.155 |
|  | L2 | 19.7 | 2.052/2.120 | 28.6 | 2.047/2.069 |
|  | L3 | 14.6 | 2.027/2.089 | 23.2 | 2.036/2.043 |

As can be understood from <Table 3>, an average value of the distance ($R_1$) and the distance ($R_2$) of the blue phosphorescent material (facial isomer) according to Experimental Example 1 in the singlet was calculated to be 2.053 and 2.112 Å, respectively. In addition, an average value of the distance ($R_1$) and the distance ($R_2$) of the blue phosphorescent material (meridional isomer) according to Experimental Example 2 was calculated to be 2.051 and 2.116 Å, respectively. In contrast, it can be seen that an average value of the distance ($R_1$) and the distance ($R_2$) of each of the blue phosphorescent materials increases in the triplet than in the singlet. Even the carbon-nitrogen-carbon-carbon bond of the blue phosphorescent material also exhibited a similar trend to that of the distance ($R_1$) and the distance ($R_2$) as described above. In other words, it was confirmed that the carbon-nitrogen-carbon-carbon bond of the blue phosphorescent material increases in the triplet than in the singlet. In this case, a difference in the distance ($R_1$), the distance ($R_2$) and an angle of the carbon-nitrogen-carbon-carbon bond in the triplet and the singlet exhibited a highest value in a first ligand (L1). Thus, it can be seen that a shape of electron transition in the blue phosphorescent material is changed due to a structural difference between the ligands as described above, and thus a non-luminescence decay rate constant as shown in <Table 2> increases.

FIG. 17 is a graph showing results of cyclic voltammetry of a blue phosphorescent material according to an embodiment of the present invention.

Referring to FIG. 17, a half oxidation potential of the blue phosphorescent materials according to Comparative Examples 1 and 2, and Experimental Examples 1 and 2 are shown in <Table 1> below.

TABLE 4

|  | $E_{ox}^{1/2}$ (eV) |
| --- | --- |
| Comparative Example 1 | 0.49 |
| Comparative Example 2 | 0.34 |
| Experimental Example 1 | 0.43 |
| Experimental Example 2 | 0.29 |

As can be seen from <Table 4> and FIG. 17, it can be seen that the blue phosphorescent material (meridional isomer) according to Comparative Example 2 and Experimental Example 2 further includes the substituent, and the half oxidation potential is reduced. Accordingly, it can be seen that the blue phosphorescent material (meridional isomer) as described above with reference to FIGS. 12 and 14 further includes the substituent, and the highest occupied molecular orbital is unstable. Although the invention has been described in detail with reference to exemplary embodiments, the scope of the present invention is not limited to a specific embodiment and should be interpreted by the attached claims. In addition, those skilled in the art should understand that many modifications and variations are possible without departing from the scope of the present invention.

INDUSTRIAL APPLICABILITY

A blue phosphorescent material according to an embodiment of the present application may be used for various display elements.

The invention claimed is:

1. A blue phosphorescent material comprising a hetero-ligand iridium complex of

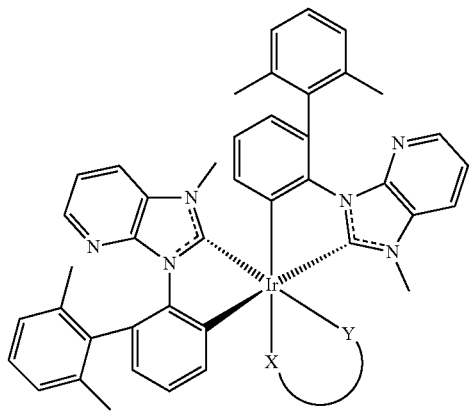

wherein X-Y represents an auxiliary ligand.

2. The blue phosphorescent material of claim 1, wherein the auxiliary ligand comprises acetylacetonate.

3. The blue phosphorescent material of claim 1, wherein the auxiliary ligand comprises phenylpyridine.

4. The blue phosphorescent material of claim 1, wherein the auxiliary ligand comprises pyridylimidazole.

5. A method for preparing the blue phosphorescent material of claim 1, the method comprising preparing a main ligand by:
   providing a 2,6-dimethylphenyl functional group to phenyl-amine; and
   preparing the main ligand by introducing imidazopyridine into a phenyl group of the phenyl-amine.

6. The method of claim 5, further comprising:
   providing a mixed solution containing the main ligand and an iridium compound; and
   preparing an iridium dimer through a metalation reaction between the main ligand and iridium of the iridium compound.

7. The method of claim 6, further comprising reacting the iridium dimer with the auxiliary ligand.

* * * * *